Patented Dec. 25, 1951

2,580,184

UNITED STATES PATENT OFFICE 2,580,184

PROCESS FOR THE OXIDATION OF CONJUNCT POLYMER HYDROCARBONS AND COMPOSITIONS DERIVED THEREFROM

Maurice J. Murray, Clarendon Hills, Ill., assignor to Universal Oil Products Company, Chicago, Ill., a corporation of Delaware No Drawing. Application July 26, 1948, Serial No. 40,794

7 Claims. (Cl. 260—451)

This invention relates to a method for modifying the air-drying properties of a mixture of polyolefinic cyclic hydrocarbons or conjunct polymers recovered from specific catalyst-hydrocarbon complex compounds formed in a conjunct polymerization reaction. The invention further relates to the production of certain useful derivatives of a mixture of conjunct polymer hydrocarbons which contain oxygen and which are formed by means of the oxidation process herein provided.

It is one object of the present invention to provide a method of oxidizing a mixture of polyolefinic cyclic hydrocarbons recovered from a catalyst-hydrocarbon sludge formed in a conjunct polymerization reaction to form thereby oxygen-containing derivatives of said hydrocarbons having modified air-drying properties and possessing other characteristics which contribute to the utility of the products in many applications as hereinafter specified. Another object of the invention is to provide a method of partially oxidizing a mixture of polyolefinic cyclic hydrocarbons or conjunct polymers to thereby modify the physical properties of said hydrocarbons in such manner that the tendency of the unmodified conjunct polymers to form a brittle, nonadhering film upon atmospheric drying is substantially eliminated. Still another object of the invention is to provide a process for oxidizing polyolefinic cyclic hydrocarbons of high molecular weight and containing a cyclopentenyl hydrocarbon structure whereby a product of corresponding structure and having attached thereto oxygen-containing groups such as carbonyl and hydroxyl radicals is obtained by virtue of said oxidation. A further object of the present process is to manufacture organic oxygen-containing compounds soluble in various organic solvents such as hydrocarbons and unsaturated fatty acid glyceride drying oils and further containing unsaturated olefinic linkages in conjugated as well as non-conjugated relationship to each other which render the same subject to further oxidation and polymerization upon exposure to atmospheric oxygen.

In one of its embodiments, the present invention concerns a process for oxidizing a mixture of polyolefinic cyclic hydrocarbons recovered from a sludge formed in a conjunct polymerization process which comprises contacting said hydrocarbon mixture dissolved in an inert diluent and solvent therefor with an oxygen-containing gas at a superatmospheric pressure for a time such that the viscosity and other properties of the reaction mixture have been substantially modified to correspond to the properties of the product desired and thereafter removing said diluent from the reaction mixture.

In accordance with a more specific embodiment of the invention, a fraction boiling up to about 300° C. and consisting of a mixture of conjunct hydrocarbon polymers of polyolefinic cyclic structure recovered from a sludge formed in a conjunct polymerization reaction and which in the unmodified state readily vaporize when exposed in thin films to atmospheric oxygen is contacted in the liquid phase at room temperature with an oxygen-containing gas at a pressure of from about 1 to about 10 atmospheres for a time such that about an equimolecular proportion of oxygen has reacted with said hydrocarbons to thereby form a modified drying oil product which does not appreciably vaporize when exposed in a thin film to atmospheric oxygen and which, on drying, forms a hard, non-brittle film.

Other objects and embodiments of the present invention relating to specific methods of conducting the present oxidation reaction and other aspects of the conversion will be hereinafter referred to in greater detail in the following further description of the invention.

It is generally recognized that certain unsaturated hydrocarbons of relatively high molecular weight and of specific structure when exposed in a thin film to atmospheric oxygen undergo what is generally considered to be a series of oxidation and polymerization reactions to form a hard, dry, somewhat elastic and tough film which provides a protective surface to the article to which the hydrocarbon drying oil is applied, the resulting dry film having properties similar to a protective coating formed when an unsaturated fatty acid glyceride drying oil is exposed to atmospheric oxygen under like conditions. These hydrocarbons are consequently useful in the formulation of coating compositions such as paints and varnishes and the resulting products have been found to possess individual characteristics, such as resistance to aqueous and alkali media, and, in fact, present distinguishing and practical differences over the fatty acid glyceride drying oils. One of the preferred sources of hydrocarbon type drying oils are certain catalyst-hydrocarbon sludges formed by or during the conjunct polymerization of unsaturated hydrocarbons under controlled reaction conditions. The drying oil hydrocarbons contained in the sludge formed as one of the products of the indicated conjunct polymerization reaction are recovered from the sludge by special methods of decomposing the catalyst-hydrocarbon addition complexes contained in the sludge whereby the highly unsaturated character of the recovered hydrocarbons is preserved. The hydrocarbon conjunct polymers as recovered from the sludge vary in molecular weight from as low as about 250 to as high as about 450, the highest boiling fractions of which have molecular weights as high as 1000. The components of the mixture of conjunct polymers thus recovered are characterized generally as polyolefinic cyclic hydrocarbons in which the unsaturation is both of the conjugated as well as non-conjugated types, although essentially non-aromatic. This structure of the hydrocarbon components in the mixture of conjunct polymers is believed to be the basic factor involved in the ability of the hydrocarbons to undergo the so-called "drying" transformation on exposure of the hydrocarbons in a thin film to atmospheric oxygen. Although all components of the conjunct polymer hydrocarbon mixture contain a high degree of unsaturation and are capable of undergoing the drying transformation if the period of exposure of the hydrocarbons in their liquid state to atmospheric oxygen is of sufficient duration to permit the oxidation-polymerization reactions involved in the drying process, observations have shown that the low molecular weight components of the full boiling range mixture of conjunct polymers are sufficiently volatile that when the mixture is spread in a thin film at ordinary room temperatures, or even below, the low boiling point components tend to evaporate and escape to the atmosphere before sufficient time has elapsed for the hydrocarbons to undergo the drying transformation and thereby become fixed in the form of a solid film to the surface to which they are applied. These low boiling point fractions, therefore, do not under ordinary circumstances contribute to the formation of the protective coating film because of their loss to the atmosphere by evaporation. The process comprising the present invention has as its primary objective the treatment of either the full boiling range mixture of conjunct polymers, or alternatively, the volatile, low molecular weight components thereof to reduce their volatility and enhance their capacity to form a protective film. It is especially desirable, when the present product is to be utilized as a drying oil, for example in coating compositions, to separate the lowest boiling fraction from the full boiling range mixture of conjunct polymers (for example, a fraction boiling up to about 250° to about 300° C.), separately convert the same in accordance with the present process and thereafter admix the wholly or partially oxidized material with the remaining higher boiling fractions of the conjunct polymer mixture to provide a suitable drying oil for incorporation into the composition. In this manner, the low boiling point fraction, which would ordinarily (in the unconverted state) be lost to the atmosphere by evaporation thereof, when exposed in a thin film to atmospheric oxidation is converted into a relatively non-volatile derivative capable of further oxidation and polymerization on drying. The present invention, therefore, contemplates in one of its embodiments an oxidative conversion of the low boiling point fraction of a mixture of polyolefinic cyclic hydrocarbons or conjunct polymers and thereafter admixing the converted fraction with the remaining higher boiling fractions of the original conjunct polymer mixture to provide a highly desirable drying oil mixture.

The primary reactant utilized as a charging stock in the present oxidation process, is the mixture of polyolefinic cyclic hydrocarbons also referred to as conjunct hydrocarbon polymers formed by means of a process known in the art as a conjunct polymerization type of reaction. In the production of said conjunct polymers, certain types of hydrocarbons, generally characterized as unsaturated, and preferably non-aromatic, when contacted with particular inorganic catalysts of the acid-acting type, at selected reaction conditions, undergo a conjunct polymerization reaction to form a sludge-like product containing loosely bound complex addition compounds of the catalyst and said conjunct hydrocarbon polymers. The latter mixture of hydrocarbons may be recovered, free of the catalyst, from the sludge by special methods of decomposition. On the basis of physical and chemical analyses thereof, the mixture of unsaturated sludge hydrocarbons obtained from open-chain olefins is found to comprise highly unsaturated hydrocarbons containing compounds of high molecular weight and of generally cyclic, non-aromatic structure in which the unsaturation is both of the conjugated and non-conjugated variety. The cyclic structures, furthermore, comprises almost wholly five-membered rings.

The properties of the ultimately recovered mixture of conjunct polymers depends to some extent upon the type of hydrocarbons employed in the sludge-forming or conjunct polymerization reaction. Suitable hydrocarbon starting materials for the preparation of the sludge comprise, in general, unsaturated hydrocarbons containing at least 3 carbon atoms per molecule, such as the mono-olefins, polyolefins and/or acetylenic hydrocarbons of either branched or straight chain structure, although branched chain hydrocarbons are believed to produce the sludge more readily and usually in greater yields. Cyclic olefins and isoparaffins may also be employed as charging stock, either individually or in admixture with, for example, mono or polyolefins. A mixture of the various classes of hydrocarbons specified above may also be charged to the reaction, the proportion of aromatic hydrocarbons in the mixture desirably being small or preferably nil, since the latter hydrocarbons tend to reduce the total yield of sludge.

An especially preferred charging stock from the standpoint of general availability and desirability in producing a sludge in high yields is an octene fraction of a selective or non-selective polymer gasoline (prepared by the copolymerization of various butylenes and/or propylenes) or the hexene-nonylene fraction of a propylene polymer. Other suitable hydrocarbon charging stocks for the preparation of the present conjunct polymers are the various fractions of thermally cracked gasoline which have been treated to reduce their content of aromatic hydrocarbons normally present in thermally cracked gasoline.

The inorganic conjunct polymerization catalysts which when contacted with the hydrocarbon charging stock having the above enumerated properties yields a sludge containing complex addition products of the catalyst with the conjunct polymers formed in the reaction are generally characterized as acid-acting polymerization catalysts and are generally substantially anhydrous. The catalysts utilizable in the present process include certain members of the anhydrous Friedel Crafts metal halide group and certain inorganic acids. Thus, anhydrous aluminum chloride and aluminum bromide, either individually or in the presence of a promoter comprising the hydrogen halide corresponding to the halogen of the aluminum halide are capable of effecting conjunct polymerization of the unsaturated hydrocarbon charging stock. Of the inorganic mineral acids utilizable as catalysts, sulfuric acid of a concentration usually above about 85%, and preferably from about 95 to about 100% concentration and hydrofluoric acid containing less than 10% water (preferably the substantially anhydrous reagent) comprise another group of the generally broad class of acid-acting catalysts utilizable to effect conjunct polymerization.

On contacting the hydrocarbon charging stock and acid-acting catalyst at reaction conditions specified, generally, as "sludge-forming" or "conjunct polymerization" reaction conditions, the catalyst promotes polymerization, cyclization and hydrogen transfer reactions of the components of the reaction mixture to form products of two types: (1) relatively saturated hydro-polymers, and (2) high molecular weight cyclic polyolefinic hydrocarbon compounds which combine with the catalyst in definite molecular proportions to form a catalyst-polyolefinic hydrocarbon addition complex comprising the sludge. The latter is a fluid, somewhat viscous product of the reaction containing definite chemical compounds of the coordinated complex type. The net result of the combined hydrogen transfer, polymerization and cyclization reactions (which, in effect, occur substantially as a simultaneous combination reaction referred to in the aggregate as a conjunct polymerization reaction) is the production of the polyolefinic cyclic hydrocarbons in combination with the catalyst as a sludge.

The sludge-forming reaction is effected by contacting the hydrocarbon starting material of the aforementioned composition, preferably an olefinic charging stock composed of olefins having at least 3 carbon atoms per molecule with the conjunct polymerization catalyst at a temperature within the range of from about 0° to about 200° C., preferably from about 30 to about 125° C. and at a sufficiently superatmospheric pressure sufficient to maintain the reactants in substantially liquid phase, generally up to about 20 atmospheres. The reaction conditions required in the formation of a sludge for each of the conjunct polymerization catalysts hereinabove specified may vary, depending upon the activity of the catalyst. For example, temperatures in the lower range of the above temperature limits are utilized when sulfuric acid is employed as catalyst, because of the oxidizing tendency of sulfuric acid at temperatures above about 150° C., the preferred reaction temperature for the use of sulfuric acid being within the range of from about −20° to about 125° C. Observation has shown that substantially anhydrous hydrofluoric acid having a concentration greater than about 95% is the preferred conjunct polymerization catalyst, not only on the basis of superior yields and quality of the hydrocarbon product recovered from the sludge, but also from the standpoint of certain operating advantages, especially in the sludge decomposition stage where thermal methods of decomposition may be employed, making it possible to recover, for recycling, a hydrogen fluoride effluent phase containing from 98 to about 100% anhydrous hydrogen fluoride.

An optimum yield of sludge is obtained, when the weight ratio of olefins to the hydrogen fluoride catalyst charged to the sludge-forming reaction zone is maintained at from about 1.5 to about 3.5, preferably from about 1.7 to about 2.5.

At the above reaction conditions and when the reaction mixture of hydrocarbons and catalyst is mixed by some form of stirring device, a liquid sludge phase and an upper layer saturated hydrocarbon phase formed as products of the conjunct polymerization reaction separate on standing, and the separate phases may be recovered by decanting one from the other.

The conjunct polymers or polyolefinic cyclic hydrocarbon mixture may be recovered from the sludge by any suitable method, depending upon the catalyst utilized in the formation of the sludge, although certain procedures provide advantages in operation which are not common to the other presently known methods of sludge decomposition. One of such methods, applicable to any of the conjunct polymerization catalyst sludges hereinabove referred to, results in the production of a highly unsaturated product but dilutes the recovered catalyst phase to such concentrations that it cannot be economically recovered for recycling purposes to the sludge-forming stage. This method which consists in hydrolyzing the sludge in an aqueous medium is effected by thoroughly mixing the sludge with water or a dilute alkali solution. During the hydrolysis, the unsaturated conjunct polymer hydrocarbons associated with the catalyst in the sludge form a separate phase and rise to the top of the mixture, while the water-soluble catalyst enters the aqueous phase. Attending the high cost of the recovery procedure for reconcentrating the acid, these methods require the use of acid-resistant equipment, not only in the aqueous hydrolysis step but also in the distillation equipment for reconcentrating the aqueous acid where sulfuric or hydrofluoric acids are utilized as conversion catalysts.

The necessity of recovering the conjunct polymerization catalyst in a nearly anhydrous state by means of an inexpensive procedure constitutes one of the chief advantages in the use of hydrogen fluoride as catalyst since hydrogen fluoride may be vaporized from the sludge, cooled and reliquefied for recycling purposes. The decomposition of the sludge may thus be effected by merely heating the sludge until the hydrogen fluoride component thereof is removed by vaporization, leaving a hydrocarbonaceous residue in which the component hydrocarbons contain more or less conjugated unsaturation, depending upon the conditions involved. The latter thermal decomposition method, however, as may be expected from the known polymerization activity of free anhydrous hydrogen fluoride, yields an inferior hydrocarbon product containing few if any, conjugated olefinic bonds desired in the production of the present oxidation product thereof. The thermal decomposition method, however, may be modified to provide a method in which many of the disadvantages associated with the simple thermal decomposition are obviated. Such modified procedures involve decomposing the sludge in the presence of a sludge decomposition catalyst or in the presence of an inert diluent which dissolves the liberated sludge hydrocarbons immediately upon decomposition and removes them from contact with the free hydrogen fluoride likewise liberated from the sludge upon thermal decomposition. In the catalytic decomposition method the hydrogen fluoride sludge, at a temperature of from about 50° to about 250° C., is charged into a reactor column packed with a catalytic material which enhances the decomposition of the sludge but retards the cracking and polymerization of the conjunct polymers released from the sludge. The hydrogen fluoride vapors, having a purity of from about 98 to 100% hydrogen fluoride, depending upon the temperature of operation, are taken overhead and condensed in auxiliary coolers, while the higher boiling conjunct polymer hydrocarbons are removed from the catalytic decomposition column as a bottoms fraction. The effective catalysts utilizable as packing materials in the catalytic decomposition column comprise certain metals which are resistant to corrosion by free hydrogen fluoride, graphitic carbon and metallic fluoride or oxyfluoride salts. Among the preferred catalysts for effecting the decomposition, lead, copper and cobalt as well as certain brasses containing copper, lead and tin have been found to be some of the most effective in obtaining decomposition of the sludge and recovery of the hydrocarbon product in which the components contain a maximum of conjugated and non-conjugated unsaturation.

In the thermal decomposition method involving decomposition of the hydrogen fluoride sludge by charging the same into a liquid pool of inert diluent, the temperature of the diluent is maintained sufficiently high that the hydrogen fluoride released upon decomposition of the sludge is immediately vaporized and separated from the liquid hydrocarbon phase in the reactor. The temperature maintained in the reactor is, on the other hand, sufficiently below the boiling point of the conjunct polymer hydrocarbon product that very little of the latter hydrocarbons are flashed into the hydrogen fluoride vapor outlet. Suitable inert liquids into which the hydrogen fluoride sludge is charged may be a hydrocarbon such as a paraffin or a naphtha boiling from about 50° to about 180° C., preferably from about 110° to about 140° C. Such hydrocarbons include the octanes, nonanes, decanes, or a mixture thereof, such as a fraction of a straight run gasoline boiling in the above range, diethylcyclohexane, trimethylcyclohexane, etc. The heat of vaporization of the hydrogen fluoride and the heat of decomposition may be supplied in the decomposition zone by maintaining the inert diluent under reflux and allowing the hydrogen fluoride sludge to come into direct contact with the hot vapors from the reboiling section.

The mixture of hydrocarbons comprising the product of the conjunct polymerization reaction containing hydrocarbons having conjugated and non-conjugated unsaturation recovered from the conjunct polymerization sludge contains a series of high molecular weight cyclic compounds of wide boiling range but of generally homologous structure, the cyclic portion of the hydrocarbons having a cyclopentenyl structure in which the olefin bond of the cyclopentene ring is in conjugation with an olefinic bond present in an alkenyl or alkapolyenyl side chain. Infra-red and ultra-violet absorption studies, as well as other analytical data, determined on the recovered conjunct polymers have indicated that the individual hydrocarbons are cyclic, although substantially non-aromatic, have isolated unsaturation in addition to conjugated unsaturation, and that the four carbon atoms which constitute the conjugated system are highly substituted, possessing, on the average, fewer than two hydrogen atoms as substituents. The hydrocarbons boil from about 150 to over 450° C., have bromine numbers above about 140, maleic anhydride values of from about 30 to about 90, an average number of olefinic double bonds per molecule from about 2.5 to about 4, of which from about 40 to about 70% are conjugated.

The oxidation of the mixture of polyolefinic cyclic hydrocarbons or conjunct polymers in accordance with the process comprising the present invention is effected by contacting the unsaturated hydrocarbons with an oxygen-containing gas such as air, a mixture thereof with added oxygen, or if desired, with pure oxygen itself, the rate of reaction increasing as the proportion of oxygen in the oxidizing gas increases. When charging a freshly prepared mixture of conjunct polymers or a mixture which has not contacted atmospheric oxygen for any appreciable period of time, an induction period is noted in the oxidation reaction during which the absorption of oxygen from the oxidizing gas progresses at a negligible rate but increases as the contact period between the liquid hydrocarbon phase and oxidizing gas is extended, finally becoming quite rapid until approximately 1 mol of oxygen has been absorbed or reacted per mol of hydrocarbons contained in the mixture of conjunct polymers. The induction period is generally from about one-half to about two hours, but this may be reduced significantly or eliminated entirely by adding to the reaction mixture from 1 to 10% by weight thereof of a previously oxidized mixture of conjunct polymers produced either in the present oxidation process or a mixture of said hydrocarbons which has been exposed to atmospheric oxygen for a period sufficient to oxidize at least a portion thereof. The induction period as well as the total length of the reaction cycle may also be reduced by increasing the ambient pressure of the oxidizing gas within the oxidation reactor, for example, up to about 10 atmospheres; superatmospheric pressures are, therefore, preferred to obtain equilibrium conditions in the oxidation process as rapidly as practicable. The liquid hydrocarbon phase comprising conjunct polymers is preferably stirred or otherwise agitated to increase the interfacial contact surface between the respective liquid hydrocarbon and gaseous phases and thus reduce the total conversion time. The temperature of the reaction mixture during the oxidation is preferably maintained below about 100° C. and above about 0° C., but temperatures as low as −30° C. and as high as 200° C. have been found to be operable, the rate of reaction at temperatures below about 0° C. being unduly slow and at temperatures higher than about 200° C. the rate is undesirably rapid, resulting in an oxidized product having a high degree of undesirable color and comprising materials no longer possessing the original high molecular weight, predominantly hydrocarbon structure of the charging stock. The most advantageous reaction temperature is from about 10° to about 50° C., since the reaction between these temperatures proceeds at a practical rate and may be conveniently interrupted at any desired stage of completion.

The mixture of conjunct polymers as such in the absence of other modifying components therein may be oxidized in accordance with the present process by contacting the hydrocarbons in a suitable reactor, such as a pressure autoclave, or by merely bubbling the oxygen-containing gas through the mixture of unsaturated hydrocarbons maintained in liquid phase, but the preferred procedure for conducting the present oxidation process comprises dissolving the conjunct polymer hydrocarbon charging stock in a solvent which is essentially inert to the oxidizing gas, such as a paraffinic hydrocarbon, a halogenated paraffin analog which remains in the liquid state at the temperature and pressure conditions maintained in the oxidation reactor. When utilized, the mixture subjected to oxidation preferably contains from about ½ to about 5 volume proportions of diluent to conjunct polymer hydrocarbons. The preferred diluent boils below the initial boiling point of the conjunct polymer charging stock, enabling the diluent to be readily separated from the final oxidation product after completion of the reaction. Of the above general group of diluents utilizable in the process, the normally liquid paraffinic and naphthenic hydrocarbons containing from about 4 to about 8 carbon atoms per molecule, such as normal butane, a pentane, normal or cyclohexane, heptane, etc. comprise the preferred diluents. The presence of the inert diluent in the reaction mixture maintains homogeneity in the liquid phase and reduces its viscosity so that thorough agitation and admixing of the reactants may be effected. A further advantage of the inert diluent is its influence in controlling the reaction rate, especially in preventing the conversion or oxidation to proceed too rapidly or too far. The presence of the inert diluent results in the production of an oxidized mixture of conjunct polymers having a lighter color and containing few if any decomposition or cracked products in admixture with the desired oxygen-containing derivatives of the charging stock.

The product of the oxidation reaction is a slightly yellow, viscous oil when the reaction is allowed to proceed until approximately an equimolar ratio of oxygen has reacted with the conjunct polymer hydrocarbon charging stock, although the resulting physical and chemical properties of the product may be modified by terminating the oxidation reaction prior to the point at which the product contains a mol of oxygen per mol of hydrocarbon reactant, normally considered to be the stage at which the oxidation is substantially complete. It has been observed in the oxidation reaction that the absorption of a mol of oxygen per mol of hydrocarbon charging stock occurs within a short time following the induction period and that further absorption of oxygen proceeds at a very slow, almost negligible rate. The product containing a mol of oxygen per mol of hydrocarbon is a tacky oleaginous substance soluble in hydrocarbons and other organic solvents such as ethers, esters, alcohols, etc. and in all probability has the approximate empirical formula: $C_nH_{2n-4}O_2$, where $n$ is a whole number having a value of from about 10 to about 30. A large proportion of the oxygen appears as carbonyl groups in the oxidized product and some as hydroxyl and carboxylic acid groups. Observation of the product further indicates that from 40 to 50% of the oxygen may be present in the product as peroxidic oxygen. Ultra violet absorption and infra red spectrum analyses of the product indicate that substantially all of the hydrocarbons originally charged have undergone at least partial oxidation, although the cyclic structure still remains in the product molecules. The infra red and ultra violet absorption bands found on analysis of the original conjunct polymer hydrocarbons have in many cases disappeared and are replaced by a conjugated double bond system containing the group:

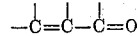

The fact that few, if any α carbon atoms are involved in the oxidation is indicated by the fact that little or no water is formed during the oxidation.

The oxidized conjunct polymer hydrocarbon product is useful as a tackifying agent for laminating and other purposes; as a component of printers ink and dyes as well as coating compositions such as paints and varnishes, where the ability of the product to "dry" on exposure to atmospheric oxygen enables the material to enter into the composition of the ultimate dry film or protective coating. In this respect, the product lends valuable individual properties to the coating composition, providing a film which is more resistant to aqueous solvents, especially alkaline and acidic solutions. The product may likewise be incorporated with other drying oils, for example, an unsaturated fatty acid glyceride, such as linseed or tung oil, to modify the drying properties of the vegetable drying oil and particularly to reduce the tendency of such oils to form a brittle film on drying or one which tends to yellow on aging. The present oxidized conjunct polymers may be cobodied with a glyceride or hydrocarbon drying oil by heating a mixture thereof to effect copolymerization of the unsaturated oils. It is not essential, however, that the components be cobodied, but the tendency of the present product to modify the drying properties of an unsaturated drying oil may be obtained by merely admixing the same therewith. The product may also be incorporated with an unoxidized mixture of conjunct polymers which in themselves dry to a hard film on exposure to atmospheric oxygen to provide a mixture of oils capable of "drying," but which does not thereby form a brittle film. When reduced with hydrogen, either partially or completely to the corresponding alcohol, the product forms a viscous oil which is valuable as a plasticizer in rubber, plastics and allied compositions. The alcohols may also be converted into derivatives thereof such as the halides, esters, ethers, etc. and provide materials which are valuable per se.

The present invention is further illustrated in the following examples which refer to individual species of the present process, although in specifying particular reactants, conversion conditions, etc. it is not intended thereby to limit the generally broad scope of the invention in strict accordance thereto.

*Example I*

A mixture of polyolefinic cyclic hydrocarbons or conjunct polymers was prepared by the reaction of a mixture of mono-olefinic hydrocarbons with liquefied hydrogen fluoride containing less than 1% water to form a hydrogen fluoride-hydrocarbon sludge phase and a relatively saturated upper layer hydrocarbon phase. The conjunct polymers were recovered from the sludge phase by the hydrolytic method for decomposing the catalyst-hydrocarbon sludge complexes. The conjunct polymers as recovered, however, dry on exposure to air to form a film which is brittle and which has little abrasion resistance. The dried film is of substantially less quantity than the original hydrocarbons exposed to atmospheric oxygen due to vaporization of the low boiling components from the mixture of conjunct polymers.

22 liters (16.5 kg.) of a non-selective copolymer having a bromine number of 116 and consisting of the copolymers of mixed butylene and propylene containing from 8 to about 12 carbon atoms per molecule was charged into a pressure autoclave and rapidly stirred as 9.0 kg. of liquid hydrogen fluoride was introduced into the reactor. The pressure was maintained throughout the reaction at an average value of about 205 pounds per square inch by means of compressed nitrogen. The temperature was increased to 90° C. and stirring was continued for an additional hour. The reaction mixture separated into two phases on standing: an upper saturated hydrocarbon layer and a lower acidic layer containing all of the hydrogen fluoride charged into the reaction. The desired lower acidic sludge layer weighed 16.1 kg. and consisted of a light brown mobile fluid having a density of 0.98 at 4° C.

5 kg. of the above hydrogen fluoride sludge was allowed to flow into a mixture of ice and water, additional ice being added as the heat of reaction melted the ice in the resulting hydrolytic reaction. 2.17 kg. of a light-colored, sweet-smelling oil separated from the aqueous phase, a yield of 42.2%, based on the weight of the original olefin charged. An examination of the oil indicated the following properties:

Boiling range. 160 to above 400° C.
Density $D_4^{20}$, 0.863
Refractive Index $n_D^{20}$, 1.4871
Color, Gardner, 12-13
Average molecular weight, 300
Diene number, 85
Bromine number, 195
Double bonds per molecule (average), 3.2

Although the above mixture of conjunct polymers was prepared from a hydrogen fluoride sludge and was recovered therefrom by an aqueous hydrolysis procedure, a similar material may be obtained from an aluminum chloride or sulfuric acid sludge, and the conjunct hydrocarbon polymers may be also recovered from the hydrogen fluoride sludge by thermally decomposing the catalyst-hydrocarbon complexes contained in the sludge.

A fraction boiling from about 200 to about 210° C. was separated from the full boiling range mixture of conjunct polymers hereinabove prepared and 50 cc. of the fraction, weighing 41 grams together with 25 cc. of cyclohexane were placed in a stirred pressure autoclave and brought to room temperature (about 30° C.) while pure oxygen at 20-30 pounds per square inch was introduced into the reactor. After an induction period of approximately 1½ hours, oxygen disappeared from the gaseous phase at a rate corresponding to about 5-10 mole per cent of the reaction mixture per hour. When approximately 1 mol of oxygen had reacted per mol of conjunct polymer hydrocarbons, the rate of oxygen disappearance fell off sharply but continued thereafter at a very slow rate. The product after removal of the cyclohexane by evaporation thereof from the mixture was a light yellow viscous liquid which is soluble in hydrocarbons and other organic solvents and had a pleasant odor reminiscent of high molecular weight aldehydes and ketones.

The product obtained by the above oxidation procedure was examined spectroscopically by infra red and ultra violet absorption analyses. The 850 and 1620 cm.$^{-1}$ bands originally present in the mixture of conjunct polymer hydrocarbons charged to the oxidation reaction have disappeared and the product has a 1725 cm.$^{-1}$ band, suggesting the presence of carbonyl and hydroxyl groups in the oxidized material. The ultra violet absorption band which occurs at 245 mμ in the original mixture of conjunct polymers is no longer present in the oxidized product and a weaker band with a maximum at 232 mμ is present, assigned to the linkage:

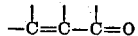

Hydrogenation of the material proceeds at a temperature of about 175° C. in the presence of hydrogen at about 50 atmospheres and a hydrogenation catalyst consisting of a composite of metallic nickel on silica hydrogel particles. A small amount of water is formed in the hydrogenation reaction and the product consists of a viscous, tacky oil.

*Example II*

A mixture consisting of 100 grams of the 200-210° fraction of the polyolefinic cyclic hydrocarbons prepared in Example I was dissolved in 100 cc. cyclohexane and 10 grams of the oxidized polyolefinic cyclic hydrocarbon product of Example I. The mixture was maintained at 20° C. as air at a pressure of 50 pounds per square inch was charged into the oxidation reactor containing the above reactants which were rapidly stirred. Oxygen absorption occurred immediately without the induction period noted in Example I, and the oxidation was completed within a shorter reaction period. After the absorption of approximately 1 mol of oxygen per mol of hydrocarbons charged, the rate of oxidation was reduced markedly and further oxidation proceeded at a very much slower rate. The recovered product was similar in physical and chemical properties to the material recovered in Example I.

I claim as my invention:

1. A process for producing an improved drying oil which comprises contacting a mixture of conjunct hydrocarbon polymers of polyolefinic cyclic structure with an oxygen-containing gas at a superatmospheric pressure and at a temperature of from about −30° to about 200° C. for a time such as to react an approximately equi-molecular proportion of oxygen with said conjunct polymers, said polymers having been recovered by decomposition of a catalyst-hydrocarbon sludge formed in a conjunct polymerization reaction of a hydrocarbon mixture containing mono-olefins of at least 3 carbon atoms per molecule and said polymers boiling between about 150° and 450° C. and having bromine numbers above about 140, maleic anhydride values of from about 30 to about 90 and an average number of olefinic double bonds per molecule of from about 2.5 to about 4, of which from about 40% to about 70% are conjugated.

2. The process of claim 1 further characterized in that said conjunct polymers are dissolved in a normally liquid diluent which is substantially inert to the oxidizing gas at the reaction conditions specified.

3. The process of claim 1 further characterized in that said oxidation reaction is effected at a temperature of from about 10 to about 50° C.

4. The process of claim 1 further characterized in that said conjunct polymers are dissolved in a normally liquid paraffinic hydrocarbon.

5. The process of claim 1 further characterized in that said normally liquid paraffinic hydrocarbon is a naphthene.

6. The process of claim 1 further characterized in that said mixture of conjunct polymers is a fraction boiling below about 300° C.

7. A composition of matter comprising the improved drying oil produced by the process of claim 1.

MAURICE J. MURRAY.

REFERENCES CITED

The following references are of record in the file of this patent:

UNITED STATES PATENTS

| Number | Name | Date |
|---|---|---|
| 2,008,103 | Hyman | July 16, 1935 |
| 2,122,826 | van Peski | July 5, 1938 |
| 2,400,520 | Kuhn | May 21, 1946 |
| 2,440,477 | Johnstone | Apr. 27, 1948 |